2,715,129

PROCESS FOR PRODUCING 5-HYDROXY-TRYPTAMINE

Kenneth E. Hamlin, Lake Bluff, Ill., assignor to Abbott Laboratories, North Chicago, Ill., a corporation of Illinois No Drawing. Application October 9, 1951, Serial No. 250,573

11 Claims. (Cl. 260—319)

This invention relates to a chemical process and more particularly to a process for preparing 5-hydroxytryptamine hydrochloride and the novel intermediates thereof.

In general the process is a four step synthesis starting from 5-benzyloxyindole. The reactions are schematically shown by the following formulae:

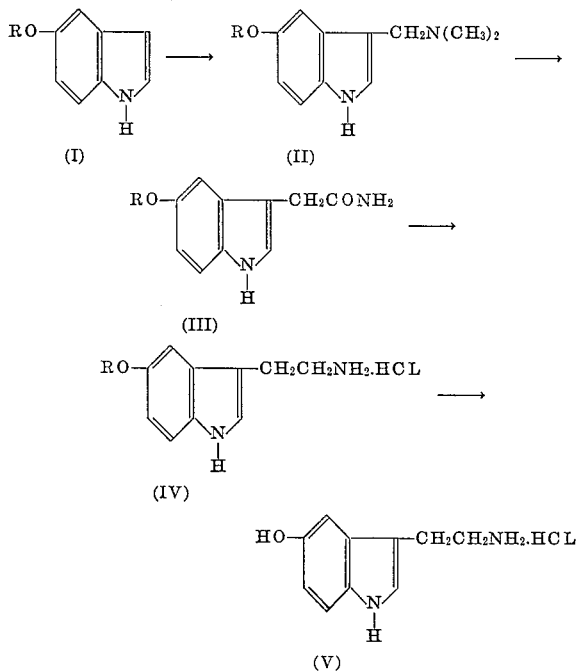

wherein R is a benzyl group.

The process involves the reaction of 5-benzyloxyindole (I) (H. Burton and J. L. Stoves, J. Chem. Soc., 1726 (1937) with formalin and dimethylamine to form 5-benzyloxygramine. The 5-benzyloxygramine is converted to 5-benzyloxyindole-3-acetamide by heating with a cyanide salt. This conversion includes the forming of 5-benzyloxyindole-3-acetonitrile, which is then hydrolyzed to the corresponding acetamide and also a small amount of the corresponding acetic acid. The 5-benzyloxyindole-3-acetamide is reduced with a metallic hydride or similar reducing agent to produce 5-benzyloxytryptamine. The 5-benzyloxytryptamine is hydrogenated to split off the benzyl group giving 5-hydroxytryptamine.

Example I

A mixture of 3 gm. of 5-benzyloxyindole (I), 1.8 gm. of formalin, and 1.14 gm. of dimethylamine dissolved in 5 cc. of glacial acetic acid is allowed to stand at room temperature for 3 hours. During the last part of the time period, the solution is made slightly alkaline with dilute sodium hydroxide solution precipitating a yellow oil. After standing, the oil becomes crystalline, and the crystals are filtered from the mixture. On recrystallization from ethyl acetate, the 5-benzyloxygramine (II) melts at 137–138° C.

Example II

About 8 gm. of 5-benzyloxygramine are admixed with a solution of about 8 gm. of sodium cyanide in 11 cc. of water and 80 cc. of ethanol. The mixture is refluxed for about 8 hours, and after cooling the refluxed mixture, 30 cc. of water is added. The alcohol is removed under vacuum leaving a residual brown oil, which crystallizes on cooling. The crystalline material is washed, dried and recrystallized from methanol. The crystalline 5-benzyloxyindole-3-acetamide (III) melts at 158° C.

Example III

An ether solution of about 2 gm. of lithium aluminum hydride and 1 gm. of 5-benzyloxyindole-3-acetamide is refluxed for about 8 hours, and sufficient water is then added to decompose the complex (about equal parts of water). The ether solution is filtered and dried over magnesium sulfate. 5-benzyloxytryptamine hydrochloride (IV) is formed by treating the ether solution of the base with ethereal hydrogen chloride. The crystalline salt after recrystallizing from an ethanol-ether solution, melts at 265° C.

Example IV

A solution of about 1 gm. of 5-benzyloxytryptamine hydrochloride in methanol is catalytically hydrogenated using a platinum-charcoal catalyst. An equivalent of hydrogen is absorbed in approximately three minutes. The mixture is then filtered and the methanol is removed under vacuum. The highly colored residue is treated with anhydrous ether giving a grey-brown solid precipitate. After treatment with charcoal and further recrystallization, a white crystalline hygroscopic material is obtained. After thorough drying, the 5-hydroxytryptamine hydrochloride (V) melts at 167–168° C.

The conversion of 5-benzyloxygramine to 5-benzyloxyindole-3-acetamide is produced by the reaction with a cyanide salt. Salts such as the alkali and alkali metal cyanides may be utilized in the reaction. Further, the catalyst in the hydrogenation of 5-benzyloxytryptamine to produce the 5-hydroxy compound may be a noble metal or a noble metal oxide common in the art of catalytic hydrogenation.

Others may readily adapt the invention for use under various conditions of service, by employing one or more of the novel features disclosed or equivalents thereof. As at present advised with respect to the apparent scope of my invention, I desire to claim the following subject matter.

I claim:

1. The process which comprises intimately admixing 5-benzyloxyindole with formalin and dimethylamine, heating the resulting 5-benzyloxygramine with a cyanide salt, reducing the resulting 5-benzyloxyindole-3-acetamide, hydrogenating the resulting 5-benzyloxytryptamine to produce 5-hydroxytryptamine.

2. The process which comprises admixing 5-benzyloxyindole with formalin and dimethylamine in the presence of acetic acid, refluxing the resulting 5-benzyloxygramine with sodium cyanide in an ethanol-water mixture, refluxing the resulting 5-benzyloxyindole-3-acetamide with lithium aluminum hydride in an ether solution, hydrogenating the resulting 5-benzyloxytryptamine in the presence of a platinum-charcoal catalyst to produce 5-hydroxytryptamine.

3. The process which comprises admixing 5-benzyloxyindole with formalin and dimethylamine in the presence of acetic acid, refluxing the resulting 5-benzyloxygramine with a cyanide salt in aqueous solution, refluxing the resulting 5-benzyloxyindole-3-acetamide with lithium aluminum hydride, reacting the resulting 5-benzyloxytryptamine with hydrogen chloride to produce 5-benzyloxytryptamine hydrochloride, and hydrogenating the 5-benzyloxytryptamine hydrochloride to produce 5-hydroxytryptamine hydrochloride.

4. The process which comprises admixing 5-benzyloxyindole with formalin and dimethylamine in the presence of acetic acid, refluxing the resulting 5-benzyloxygramine with a cyanide salt in aqueous solution, refluxing the resulting 5-benzyloxyindole-3-acetamide with lithium aluminum hydride, and reacting the resulting 5-benzyloxytryptamine with hydrogen chloride to produce 5-benzyloxytryptamine hydrochloride.

5. The process which comprises intimately admixing 5-benzyloxyindole with formalin and dimethylamine in the presence of glacial acetic acid to form 5-benzyloxygramine.

6. The process which comprises refluxing 5-benzyloxygramine with sodium cyanide in a water-ethanol mixture to produce 5-benzyloxyindole-3-acetamide.

7. The process which comprises refluxing 5-benzyloxyindole-3-acetamide with lithium aluminum hydride in ethereal solution to form 5-benzyloxytryptamine.

8. The process which comprises intimately admixing 5-benzyloxyindole with formalin and dimethylamine to form 5 benzyloxygramine, heating said 5-benzyloxygramine with a cyanide salt to form 5-benzyloxyindole-3-acetamide, reducing the 5-benzyloxyindole-3-acetamide to form 5-benzyloxytryptamine, reacting the tryptamine with hydrochloric acid to form 5-benzyloxytryptamine hydrochloride, and hydrogenating the last named product to form 5-hydroxytryptamine hydrochloride.

9. In the process of producing 5-hydroxytryptamine, the steps which comprise heating 5-benzyloxyindole-3-acetamide with lithium aluminum hydride, admixing the resulting 5-benzyloxytryptamine with hydrogen chloride, and hydrogenating the resulting 5-benzyloxytryptamine hydrochloride to form 5-hydroxytryptamine hydrochloride.

10. The compound 5-benzyloxygramine.

11. The compound 5-benzyloxyindole-3-acetamide.

References Cited in the file of this patent

UNITED STATES PATENTS 2,416,258     Jenkins  ---------------- Feb. 18, 1947

OTHER REFERENCES

Wieland et al., Annalen der Chemie, vol. 513 (1934), pp. 1–25.

Kornfeld, Jr., Org. Chem., vol. 16, pp. 806–809 (May 1951).